United States Patent Office 3,046,254
Patented July 24, 1962

3,046,254
METHOD FOR THE PREPARATION
OF POLYUREAS
Yanosuke Inaba, Fujisawa City, Kunihiko Miyake, Kamakura City, and Goro Kimura, Fujisawa City, Japan, assignors to Toyo Koatsu Industries, Inc., Tokyo, Japan, a corporation of Japan
No Drawing. Filed June 2, 1960, Ser. No. 33,406
6 Claims. (Cl. 260—77.5)

This invention generally relates to a method for preparing improved polyurea polymers including copolymers and methods for making them. The invention relates more particularly to an improved substantially linear, polyurea polymer wherein at least one member selected from the class consisting of primary diamines having straight-chain saturated aliphatic hydrocarbon radicals wherein at least one unspecified carbon atom is bonded to at least one side-chain alkyl group, said diamines having a total carbon atom per molecule content of 4 to 11 inclusive, and their carbonates and one urea compound selected from the group consisting of urea, thiourea, methylene diurea, ethylene diurea, methylene dithiourea and ethylene dithiourea are subjected to polycondensation to obtain said polyurea.

Still more particularly this invention relates generally to an improved polyurea copolymer and a method for manufacturing the same; namely, an improved polyurea copolymer and a method for manufacturing the same wherein at least one member selected from the class of straight-chain polymethylene diamines and their carbonates, at least one member selected from the class of primary diamines having straight-chain saturated aliphatic hydrocarbon radicals wherein at least one unspecified carbon atom of the chain is bonded to at least one branch alkyl group, and their carbonates, and a urea compound selected from the group of urea, thiourea, methylene diurea, ethylene diurea, methylene dithiourea and ethylene dithiourea are subjected to polycondensation to obtain said copolymer.

Polyureas having straight-chain polymethylene radicals which are formed into molded articles or fibers possess excellent physical and chemical properties, e.g., excellent tenacity, Young's modulus, elastic recovery, water-proofness and resistance to chemicals. However, since they have comparatively high melting points and low decomposition temperatures, it is rather difficult for them to be melt-spun, and the dyeability of fibres formed thereof is not good. Moreover there arise some difficulties in the molding application of resins formed thereof by reason of their high melting points, and low decomposition temperatures and a tendency towards foaming. Molded products are rather brittle and not transparent. The above-mentioned disadvantages and drawbacks are most frequently and prominently observed in those polyureas that have not less than 6 carbons.

Generally, in preparing polyureas by polycondensation under heating from a urea compound and alkylene diamine, the reaction product undergoes solidification in course of said condensation and this leads to local overheating of the product; hence the reaction does not uniformly and homogeneously proceed, and the product tends to have bridging and branching formations along the polymer chain.

On the other hand, polyureas prepared by polycondensation under heating of one urea compound selected from urea, thiourea and their derivatives and heteromembered aliphatic diamines or derivatives in which each methylene radical is bonded to at least one ether (—O—) or thioether (—S—) group, possess the disadvantage of a high specific gravity and furthermore they become opaque or untransparent when subjected to cooling from a molten state. Nevertheless, they are considerably improved over those polyureas that contain straight-chain polymethylene radicals.

Thus an object of the present invention is to provide an improved method for preparing an improved polyurea polymer.

Another object of the invention is to provide an improved method for an improved polyurea polymer excellent in spinnability, and physical and chemical properties when made into fibers or molded articles.

A further object of the invention is to provide an improved method for preparing a polyurea wherein polycondensation proceeds homogeneously and uniformly with reduction or elimination of local overheating.

The objects as set forth hereinabove are realized in the following manner. At least one diamine selected from the class consisting of primary diamines having straight-chain saturated aliphatic hydrocarbon radicals wherein at least one unspecified carbon atom of the chain is bonded to at least one alkyl group, said diamine having a total carbon atom per molecule content of 4 to 11 inclusive, and their carbonates, and one urea compound selected from the group consisting of urea, thiourea, methylene diurea, ethylene diurea, methylene dithiourea and ethylene dithiourea in an amount preferably corresponding to an approximately equimolecular ratio are advantageously, though not necessarily, dissolved in a solvent, for example, water, phenol and m-cresol, and the resulting mixture is heated in an inert gas atmosphere such as pure nitrogen or hydrogen. Heating is continued with a gradual elevation of temperature up to 200–280° C., in which duration the solvent, if any, is distilled off and polycondensation is thereby completed.

The diamines as specified hereinabove may be represented by the following chemical structure:

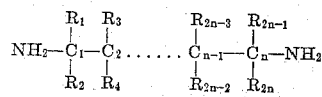

wherein $n$ is in the range of 2–10, and $R_1, R_2 \ldots R_{2n}$ stand for $C_mH_{2m+1}$, $m$ being in the range of 0 to 3. The diamines as employed in this invention have a carbon atom number totalling 4 to 11 per molecule, and in which each side-chain alkyl group should have a carbon atom number not higher than three and should be of the normal- or iso-type. Polyureas prepared from such diamines as have a total carbon atom per molecule number of 3 or less have high melting points and are unstable to heat, while polyureas made from such diamines as have a total carbon atom per molecule number exceeding 11 have such low melting points that they are not suitable for practical use.

Moreover, the use of the diamines of the above nature cause no solidification to the reaction mass in the course of polycondensation. This means that the reaction can be easily controlled and the resulting polyureas have no bridging or branching formations.

While the polyurea polymers prepared as described above by polycondensation under heating of a urea compound selected from urea, thiourea and their derivatives and a primary diamine having a straight-chain saturated aliphatic hydrocarbon radical, wherein at least one unspecified carbon atom of the chain is bonded to at least one branch alkyl group, are facile in their molding applications to form molded products, and the products possess excellent physical and chemical properties such as a low specific gravity, transparency and a high impact resistance, they are excellent also in spinnability, and fibers formed thereof are excellent in dyeability, stability to heat and have a low specific gravity. However, they have the drawbacks of low melting points and large elongation.

Thus a still further object of the present invention is to provide an improved polyurea copolymer and an improved method for preparing the same.

Another object of the invention is to provide an improved polyurea copolymer which possesses the excellent properties intrinsic in polyurea polymers having alkylene groups with branch alkyl radicals as well as excellent physical and chemical properties in spinnability, dyeability and other properties as fibers.

The further objects as set for the hereinabove are realized in the following manner. At least one member selected from the class consisting of diamines having straight-chain polymethylene radicals and their carbonates, at least one member selected from the class consisting of diamines having straight-chain saturated hydrocarbon radicals, wherein at least one unspecified carbon atom of the chain is bonded to at least one branch alkyl group, and their carbonates, and a urea compound selected from the class consisting of urea, thiourea, methylene diurea, ethylene diurea, methylene dithiourea and ethylene dithiourea, in an amount corresponding to an approximately equimolecular ratio between the total of the first described diamine and the second described diamine and the urea compound, preferably, though not necessarily, are dissolved in solvent, for example, water, phenol and m-cresol, and the resulting mixture is heated in an inert gas atmosphere such as nitrogen or hydrogen. Heating is continued with a gradual elevation of temperature up to 200–280° C., in which duration the solvent, if any, is distilled off and thereby polycondensation is completed.

The diamines having straight-chain polymethylene radicals as specified hereinabove should have a total number of 2–20 carbon atoms per molecule; the primary diamines having saturated aliphatic hydrocarbon radicals wherein at least one unspecified carbon atom is bonded to at least one side-chain alkyl group as specified hereinabove should have a total carbon atom number totalling 3–20 per molecule, in which each side-chain alkyl group should have a carbon atom number ranging from 1 to 10 per group and it should be of normal- or iso-type. The latter diamines may be represented by the following chemical structure:

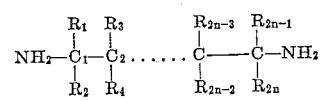

wherein $n$ is in the range of 2 to 19, and $R_1, R_2, \ldots R_n$ stand for $C_mH_{2m+1}$, $m$ being in the range of 0 to 10.

To obtain the linear polyurea polymers and copolymers under the present invention it is most practical that the polycondensation as set forth hereinbefore be carried out in a process comprising three stages: (a) the first stage: The diamine or diamines as the case may be specified hereinbefore or their respective carbonates, and one urea compound specified hereinbefore in an amount corresponding to an approximately equimolecular ratio of total diamine to urea are preferably, though not necessary, dissolved in a solvent as specified hereinbefore, and the resulting mixture is permitted to react by heating at 80–130° C. for a period of time until the evolution of ammonia from the reaction mass ceases, and thereby an almost complete bimolecular condensate or a mixture of bimolecular condensates is formed; (b) the second stage: The bimolecular intermediate compound obtained in the preceding stage is subjected to gradual heating to cause the condensation to proceed; a violent evolution of ammonia is normally observed at temperatures between 140 and 190° C., and when this occurs heating is temporarily halted so as to control the reaction. The solvent, if any, is distilled off in this duration and thereafter heating is resumed to conclude the so-called de-ammoniation and a low molecular weight or semi-polymer is obtained; (c) the third stage: The low molecular weight or semi-polymer obtained in the preceding stage is further caused to react between 200° C. and 280° C., and preferably at a reduced pressure of 1 to 2 mm. Hg, for a period of time sufficient to form a linear high molecular weight or super-polymer.

Since the polyurea polymer or the copolymer has a tendency towards undergoing the so-called "urea disarrangement" at an elevated temperature, or in other words it undergoes decomposition or depolymerization, it is preferable to employ a viscosity stabilizer, for example, an aliphatic monobasic acid, an alkylmonamide, an alkylmonoamine or a N-acyl-alkylenediamine, so as to convert the terminal urea radicals of the polymer into radicals other than urea radicals and to give it thermal stability. It is desirable that each alkyl group, acyl group or alkylene group in such stabilizers should have from 6 to 18 carbon atoms to the molecule. It is also desirable that the stabilizer should be employed in an amount of 0.001–0.07 mole for every mole of urea compound. It may be added in any reaction stages prior to the third stage set forth hereinbefore.

The polyurea polymers of this invention are excellent in melt-spinnability in a molten mass or chips. Fibers formed from the polymers are capable of being elongated at room temperature and are excellent in tenacity, curling property and dyeability. The molten polyurea polymer may be gradually cooled to obtain a colorless, transparent resin. The resin formed is facile in molding applications, excellent in resistances to impact and electricity, highly water-proof and furtherfore it has a low specific gravity. The following table sets forth comparisons between 2-ethyloctane polyurea, 2.5 diethylhexane polyurea of the invention and some other polymers.

COMPARISON BETWEEN POLYAMIDE SYNTHETIC FILAMENTS AND POLYUREA SYNTHETIC FILAMENTS OF THE INVENTION

| Name of Filaments | Specific gravity | Melting point, °C. | Softening point, °C. | Tensile strength (g./d.) | | Loop-tensile strength (g./d.) | Elongation, percent | | Recovery of elongation (percent) | Young's modulus (kg./mm.$^2$) | Resistance to chem. (percent)[1] | | Dyeability [2] k (mg./g.hr.) | |
|---|---|---|---|---|---|---|---|---|---|---|---|---|---|---|
| | | | | in a dry state | in a wet state | | in a dry state | in a wet state | | | in 20% NaOH soln | in 40% H$_2$SO$_4$ soln | acidic dye | dispersed dye |
| 6.6-Nylon | 1.09–1.14 | 250 | 235 | 4.6–5.9 | 4.0–5.2 | 3.9–5.1 | 26–32 | 30–37 | 100 (2–8% elong.) | 150–250 | 96 | ([3]) | 36 | 26 |
| Polycaproamide | 1.10–1.14 | 215 | 180 | 5.0–6.4 | 4.2–5.9 | 4.5–5.4 | 28–36 | 38–48 | 98–100 (3% elong.) | 250–400 | 97 | ([3]) | 32 | 28 |
| Nonamethylene-polyurea | 1.05–1.08 | 236 | 225 | 4.5–5.5 | 4.5–5.5 | 3.3–4.0 | 20–22 | 22–24 | 100 (3% elong.) | 450–600 | 92 | 91 | 20 | 31 |
| Ditetramethylene-ether-polyurea | 1.14–1.16 | 216 | 200 | 4.4–5.5 | 4.2–5.3 | 3.6–4.0 | 28–30 | 30–33 | 99–100 (3% elong.) | 270–350 | 93 | 50 | 2,040 | 35 |
| 2-ethyloctane polyurea | 1.01–1.02 | 200 | 182 | 4.0–5.0 | 4.0–5.0 | 4.0–4.8 | 24–26 | 24–27 | 100 (3% elong.) | 350–450 | 93 | 92 | 550 | 70 |
| 2,5-diethylhexane-polyurea | 0.95–1.02 | 185 | 163 | 3.8–4.5 | 3.8–4.5 | 3.8–4.5 | 22–26 | 23–28 | 99–100 (3% elong.) | 300–400 | 93 | 91 | 1,240 | 80 |

[1] The percentage weakening in tensile strength after 10 hours immersion.
[2] k stands for equilibrium velocity constant (mg./g.hr.). The acidic dye used in Mitsui Brilliant Milling Red, the bath concentration being 3%, the bath temperature 100° C, pH 2, the bath ratio 100. The dispersed dye used is Miketon Fast Brown, the condition being similar to the above.
[3] Instantaneously dissolved.

The following examples illustrate the preparation of polyurea polymers in accordance with this invention. All parts are by weight.

Example 1

A mixture comprising 176 parts 1,8 diamino-2-ethyloctane, 60 parts urea, 2.5 parts palmitic acid (corresponding to a molecular ratio of 102:100:1) was placed in a reactor with a gas outlet. Nitrogen was circulated therein to prevent the mixture from contacting air. The mixture was heated to 100° C. for 1.5 hours and upon melting of the mixture heating was further applied. The reaction mass violently reacted at 170–180° C. evolving ammonia. Upon the evolution of ammonia, the temperature was temporarily fixed. After the evolution diminished further heating was applied up to 245° C. Then the reaction was continued at a reduced pressure of 1 mm. Hg for about 4 hours thereby obtaining a colorless, transparent molten product. During the heating set forth the reaction mass did not undergo solidification, and with the evolution of ammonia it became a viscous liquid and the polycondensation reaction proceeded uniformly and homogeneously. The molten product remained completely transparent and colorless after gradual or rapid cooling to room temperature. The product had a melting point of 195–200° C. and a specific gravity of 1.0164.

It was subjected to molding in a molding machine of Windor 30Z type, and the molded product was colorless and transparent and had a good stability to heat and an excellent fluidity.

The molten product was excellent in spinnability and was capable of being spun into long fibers. The fibers were uniformly and deeply dyed by various dyestuffs; they were excellent in fade resistance to washing and sunlight.

Example 2

A mixture comprising 174 parts 1,6-diamino-2,5-diethylhexane, 132 parts methylene diurea and 2.6 parts octylamine, the molecular ratio being 101:100:2, was dissolved in 200 parts phenol and the resulting solution was placed in a reactor with a gas outlet, wherein heating was applied up to 120° C. for 2 hours. After it was well dissolved, the reaction mixture was further heated, with the reactor being filled with circulating nitrogen. At 160–175° C. the reaction became violent with an evolution of ammonia. Upon the evolution of ammonia, the temperature was temporarily fixed. After the evolution diminished further heating was applied up to 200° C. Then the solvent was distilled off and heating was further applied up to 260° C. Then heating was continued for about 5 hours at a reduced pressure of 1.5 mm. Hg and at 260° C. thereby obtaining a colorless, transparent molten product. The product became a glossy, transparent, colorless substance after being gradually cooled. The product was easy in molding applications; also it was easily spun into fibers in a molten state or in chips. It had a specific gravity of 0.956 to 1.012 and a melting point of 185 to 193° C.

Example 3

A mixture comprising 119 parts 1,5-diamino-3-methylheptane, 76 parts thiourea, 2.6 parts palmitic acid amide, the molecular ratio being 102:100:1, was dissolved in 100 parts water and the resulting mixture was placed in a reactor with a gas outlet. Hydrogen was circulated therein to prevent the mixture from contact with air. The mixture was heated to 110° C. for about 3 hours, during which time a major portion of the water content was distilled off, and thereby a low molecular weight condensate was obtained. Heating was continued and the reaction mass violently evolved ammonia between 160 and 170° C. Upon the evolution of ammonia, the temperature was temporarily fixed. After the evolution diminished, further heating was applied up to 250° C. In course of the above de-ammoniation, the reaction mass increased in viscosity. During the heating no solidification occurred in the mass and the reaction proceeded homogeneously and uniformly. Then reaction was continued at a reduced pressure of 2 mm. Hg for about 6 hours, thereby obtaining a colorless, transparent molten product.

The product was excellent in melt-spinnability and was easily spun into long fibers. Fibers obtained therefrom were uniformly and deeply dyed by various dyestuffs and their fade resistances to washing and sunlight were very good. The molten product had a melting point of 245–250° C. and a specific gravity of 1.004 to 1.015. Resins obtained therefrom in the form of chips were excellent in their molding applications, and the molded articles were colorless and transparent.

Example 4

A mixture comprising 178 parts of the carbonate of 1,6-diamino-3-methylhexane, 60 parts urea and 1.6 parts pelargonic acid dissolved in 100 parts water, were placed in a reactor with a gas outlet. Nitrogen was circulated therein to prevent the mixture from contacting air. The mixture was heated to 120° C. for 4 hours, during which a major portion of the water content was distilled off and furthermore ammonia carbonate formed as a by-product was decomposed and dispersed in the form of vapor. Heating was continued and the reaction mass violently evolved ammonia. Upon the evolution of ammonia temperature was temporarily fixed. After the evolution diminished further, heating was applied up to 250° C. In course of the above-mentioned de-ammoniation, the reaction mass increased in viscosity. The reaction was continued at a reduced pressure of 1 mm. Hg for 4 hours thereby obtaining a colorless, transparent molten product. It had a melting point of 235 to 240° C. and a specific gravity of 1.002 to 1.030. A colorless, transparent resin was obtained by cooling it to room temperature.

The molten product was facile in melt-spinnability and fibers formed thereof were uniformly and deeply dyed by various dyestuffs and were excellent in fade resistances to light and alkaline substances. Besides, resins formed thereof were stable to heat and excellent in their molding applications to form plastic articles.

Example 5

A mixture comprising 133 parts 1,5-diamino-2,4-dimethylpentane, 60 parts urea and 2.6 parts palmitic acid amide in a molecular ratio of 102:100:1 was placed in a reactor with a gas outlet. Nitrogen was circulated therein to prevent the mixture from contacting air. The mixture was heated to 70 to 100° C. for 7 hours, during which the urea content was melted and ammonia evolved. The amount of ammonia evolved corresponded to 50% of the theoretical amount. The low condensate in this stage contained over 98% of omega-amino-2,4-dimethylpentyl urea. Upon further heating, the low condensate gradually increased in viscosity with an evolution of ammonia. Between 170 and 180° C. the reaction system violently evolved ammonia but was in the form of a viscous liquid without being solidified, and the reaction proceeded homogeneously and uniformly. After the temperature had reached 240° C., the reaction was continued at a reduced pressure of 1 mm. Hg for about 5 hours and thereby a colorless, transparent molten product was obtained. The molten product was excellent in melt-spinnability and was easily spun into long fibers. Filament formed thereof had a tenacity of 5 to 6.5 grammes per denier and it was deeply and uniformly dyed by various dyestuffs. Besides, it was excellent in fade resistance to alkaline substances and light.

The molten product remained colorless, transparent and stable to heat after cooling to room temperature. Resins formed thereof were subjected to molding in a molding machine of Meiki-Hydra 30Z type and the molded product was excellent in impact resistance and still colorless and transparent. The molten product had a specific gravity of 0.98–1.015 and a melting point of 220–225° C.

Example 6

A mixture comprising 73 parts 1,6-diamino-2,4-dimethylhexane, 66 parts 1,6-diamino-2-methylhexane, 60 parts urea and 1.2 part caproic acid amide in a molecular ratio of 51:51:100:1, dissolved in 100 parts water was placed in a reactor with a gas outlet. Hydrogen was circulated therein and heating was applied up to 98–100° C. for 3 hours. Then further gradual heating was applied with the distilling off of the water from the reaction system. In this duration the reaction mass violently evolved ammonia. Upon the evolution of ammonia temperature was temporarily fixed. After the evolution had diminished further heating was applied up to 240° C. Then the reaction was continued at a reduced pressure of 1.5 mm. Hg for about 3 hours and thereby a molten substance was obtained. It had a low crystallinity and was facile in making films and in molding applications. Products obtained therefrom were transparent and colorless. The molten substance had a melting point of 220 to 225° C. and specific gravity of 0.94 to 1.012.

Example 7

A mixture comprising 160 parts, 1,6-diamino-3-isopropylhexane, 60 parts urea and 2.6 parts palmitic acid amide in a molecular ratio of 101:100:1 was placed in a reactor with a gas outlet. Nitrogen was circulated therein to prevent the mixture from contacting air. Further nitrogen was fed therein until the pressure reached 2 kg./cm.$^2$. Heating was applied up to 120° C. for 4 hours and thereafter gradual heating was applied. In this duration the reaction system violently reacted with an evolution of ammonia. The ammonia evolved was discharged in order to halt the elevation of the gas phase pressure. After the evolution of ammonia had diminished heating was resumed up to 250° C., when further reaction took place at a reduced pressure of 1.5 mm. Hg for 3 hours. Thereby the polycondensation reaction became completed homogeneously and uniformly and a transparent, colorless molten product was obtained. It was easily melt-spun and was easily spun into long fibers. Besides, it was easy also in treatment to form films and in molding applications. The molten product had a melting point of 180–185° C. and a specific gravity of 1.008 to 1.025.

Example 8

A mixture comprising 221 parts of the carbonate of 1,6-diamino-2,5-methylisopropylhexane, 76 parts thiourea and 2.5 parts palmitic acid in a molecular ratio of 102:100:1 was placed in a reactor with a gas outlet. Nitrogen was circulated therein to prevent the mixture from contacting air. Heating was applied up to 120° C. for 3 hours and thereafter gradual heating was applied. Between 160° C. and 170° C. the reaction system violently reacted with an evolution of ammonia. In this duration temperature was fixed temporarily in order to halt the proceeding of reaction. After the evolution of ammonia had diminished, heating was resumed. In the course of the above-mentioned de-ammoniation the reaction mass increased in viscosity without ever being solidified. The reaction continued at 250° C. and at a reduced pressure of 1 mm. Hg for 4 hours and thereby a transparent, colorless molten product was obtained. It was good in melt-spinnability and in forming chips. Besides, it was stable to heat and was easily formed into films and was facile in molding applications as a plastic. The molten product had a melting point of 170–176° C. and a specific gravity of 0.97 to 1.020.

The polyurea copolymers obtained according to the present invention have a comparatively low melting point, a high decomposition temperature, a good spinnability and are excellent in molding application. Molded articles formed thereof have excellent physical properties such as low specific gravity and large impact resistance. Fibers formed thereof are good in dyeability, and have excellent physical properties such as high tenacity, a good Young's modulus and a good elastic recovery.

In preparing the polyurea copolymer of the invention, the proportion between the diamine having only straight-chain polymethylene radicals and the diamine having branch alkyl groups on polymethylene radical can be varied as one chooses. For example, if the diamine proportion is more in favor of the straight-chain polymethylene diamine, fibers formed thereof will have a better curling property and a better Young's modulus polyurea copolymer containing a lower proportion thereof. Moreover such fibers will have an excellent dyeability and stability to heat, a low specific gravity and a high tenacity. Resins formed thereof will have a comparatively low specific gravity and a large impact resistance; besides, other physical and chemical properties in them will be excellent also.

The following table sets forth comparisons between the polyurea copolymers of the invention obtained from the copolymerization between 1.8-octamethylene diamine, 1,8-diamino-2-ethyloctane and urea as well as 1,8-diamino-2-ethyloctane, 1,6-hexamethylene diamine and urea and some other polyureas.

COMPARISON BETWEEN POLYUREA SYNTHETIC FILAMENTS AND COPOLYMERIZED POLYUREA SYNTHETIC FILAMENTS OF THE INVENTION

| Name of Filaments | Specific gravity | Melting point, °C. | Softening point, °C. | Tensile strength (g./d.) | | Loop-tensile strength (g./d.) | Elongation, percent | | Recovery of elongation (percent) | Young's modulus (kg./mm.²) | Resistance to chem. (percent)[a] | | Dyeability[b] k (mg./g.hr.) | |
|---|---|---|---|---|---|---|---|---|---|---|---|---|---|---|
| | | | | in a dry state | in a wet state | | in a dry state | in a wet state | | | in 20% NaOH soln | in 40% H₂SO₄ soln | acidic dye | dispersed dye |
| 2-ethyloctane-polyurea | 1.01–1.02 | 200 | 182 | 4.0–5.0 | 4.0–5.0 | 4.0–4.8 | 24–26 | 24–27 | 100 (3% elong.) | 350–450 | 93 | 92 | 550 | 70 |
| Hexamethylene-polyurea [1] | 1.12–1.14 | 297 | 280 | 0.05–0.1 | 0.05–0.1 | below 0.05 | | | | 20 | 88 | 85 | 0.2 | 0.3 |
| Octamethylene-polyurea [2] | 1.09–1.11 | 269 | 252 | 0.2–0.3 | 0.2–0.3 | below 0.1 | | | | 30 | 89 | 84 | 0.2 | 0.3 |
| 2-ethyloctane-hexamythylene-polyurea [3] | 1.02–1.04 | 218 | 183 | 3.5–4.2 | 3.4–4.1 | 3.5–4.2 | 18–20 | 18–20 | 99–100 (3% elong.) | 330–420 | 92 | 91 | 1,420 | 110 |
| 2-ethyloctane-octamethylene-polyurea [4] | 1.03–1.06 | 235 | 210 | 3.2–3.9 | 3.1–3.7 | 3.2–3.9 | 20–23 | 20–24 | 99–100 (3% elong.) | 400–500 | 97 | 93 | 1,050 | 120 |

[a] The percentage weakening in tensile strength after 10 hrs. immersion.
[b] k stands for equilibrium velocity constant (mg./g.hr.). The acidic dye used is Mitsui Brilliant Milling Red, the bath concentration being 3%, the bath temperature 100° C., pH 2, the bath ratio 100. The dispersed dye used is Miketon, Fast Brown, the conditions being similar to the above.
[1] Hexamethylene polyurea: It has a decomposition temperature of 283° C.; between 315–320° C. it violently foams by thermal decomposition and is converted to a yellowish or brown-yellowish one. Such a one is very difficult to be melt-spun and therefore it is unable to obtain fibers to be served for actual use.
[2] Octamethylene polyurea: It has a decomposition temperature of 280° C.; between 280–290° C. it violently foams by thermal decomposition and is converted to a yellowish one. Such a one is very difficult to be melt-spun and therefore it is unable to obtain fibers to be served for actual use.
[3] 2-ethyloctane-hexamethylene polyurea: 1,8-diamino-2-ethyloctane, 1,6-hexamethylene diamine and urea are copolymerized in a molecular ratio of 81:20:100.
[4] 2-ethyloctane-octamethylene polyurea: 1,8-diamino-2-ethyloctane, 1,8-octamethylene diamine and urea are copolymerized in a molecular ratio of 21:80:100.

The following examples illustrate the preparation of polyurea copolymers in accordance with this invention. All parts are by weight.

*Example 9*

A mixture of 141 parts of 1,8-diamino-2-ethyloctane, 35 parts 1,10 diaminodecane, 60 parts urea and 1.2 parts caproic acid amide corresponding to a molecular ratio of 82:20:100:1 was fed into a reactor with a gas outlet, wherein it was heated at 120° C. for 3 hours and thereafter the temperature was elevated further. The reaction mass became violent between 170° C. and 180° C. with an evolution of ammonia. The temperature was further elevated, and upon diminishing of the evolution of ammonia, the reaction mass was reacted further for about 4 hours at 240° C. at a reduced pressure of 1.2 mm. Hg, and thereby a molten product having favorable spinnability was obtained. It was stable to heat, capable of being easily spun into long fibers and was deeply and uniformly dyed by various kinds of dyestuffs. It was especially excellent in dyeability by acid dyes. The tenacity of filament obtained therefrom was 5 to 6.4 grammes per denier. The molten product remained transparent and colorless after standing at a room temperature, and it was favorably subjected to treatments to form films and molded articles. It has a melting point of 185 to 195° C. and a specific gravity of 1.0258.

*Example 10*

A mixture of 70 parts 1,6 diaminohexane, 55 parts 1,6-diamino-2-methylhexane, 76 parts thiourea and 2.5 parts palmitic acid corresponding to a molecular ratio of 60:42:100:1 dissolved in 50 parts water, was fed into a reactor with a gas outlet, wherein it was heated at 95 to 98° C. for 2 hours, and thereafter the temperature was elevated. At 120° C. water was distilled off the reaction system and upon further elevating the temperature, the reaction mass violently reacted with an evolution of ammonia. The heating temperature was further elevated, and after the evolution of ammonia decreased, the reaction mass was further reacted for about 3 hours at 250° C. at a reduced pressure of 2 mm. Hg, and thereby a transparent colorless molten product was obtained which had a favorable spinnability and was easily spun into long fibers. The tenacity of each filament obtained therefrom was 4.5 to 5.5 grammes per denier and it had a Young's modulus of 400 kilogrammes per square millimetre. Fibers obtained therefrom were uniformly dyed by various dyestuffs, were favorable in fastness to laundry and were resistant to alkalis. The molten product was favorably subjected to treatments to form films and molded articles since it was resistant to impact as a plastic.

*Example 11*

A mixture comprising 136 parts carbonate of 1,8-diaminooctane, 65 parts carbonate of 1,6-diamino-2,5-diethylhexane, 132 parts methylene diurea and 2.6 parts palmitic acid amide corresponding to a molecular ratio of 72:30:100:1 dissolved in 100 parts water was fed into a reactor with a gas outlet, wherein it was heated at 98 to 100° C. for about 4 hours, and then the temperature was gradually elevated. Then water was distilled off the reaction system. Upon further elevating the temperature, the reaction mass violently reacted at 170 to 180° C. with an evolution of ammonia.

The temperature was further elevated, and after the evolution of ammonia decreased, the reaction mass was further caused to react for about 4 hours at 250° C. at a reduced pressure of 1.5 mm. Hg, and thereby the polycondensation reaction was completed and a transparent, colorless molten product was obtained. It was stable to heat and was capable of being spun into long fibers. Filaments obtained therefrom had a tenacity of 5 to 6 grammes per denier. It was dyed uniformly and deeply by various acid dyes and as dyed was excellent in resistances to alkalis and light. The molten product was favorably subjected to treatments to form films and molded articles since it was resistant to impact as a plastic.

*Example 12*

A mixture comprising 52 parts 1,5-diaminoheptane, 51 parts 1,4-diamino-2-methyl-butane, 60 parts urea and 1.6 parts pelargonic acid corresponding to a molecular ratio of 51:50:100:1 dissolved in 100 parts meta-cresol was fed into a reactor with a gas outlet, wherein is was heated at 120° C. for 3 hours and then the temperature was elevated. The reaction mass violently reacted at 170° C. to 180° C. with an evolution of ammonia. The temperature was further elevated with the distilling off of meta-cresol. The mass, after the evolution of ammonia was decreased, was further heated up to 260° C. where it was reacted for about 3 hours at a reduced pressure of 1mm. Hg, and thereby a colorless, transparent molten product was obtained. It was capable of being spun into long fibers. Characteristics of filament obtained therefrom were similar to those in Example 1. The molten product was favorably subjected to treatments to form films and molded articles since it was resistant to impact as a plastic.

Example 13

A mixture comprising 32 parts 1,6-diamino-3-isopropylhexane, 94 parts 1,6-diaminohexane, 76 parts thiourea and 2.6 parts octylamine corresponding to a molecular ratio of 20:81:100:2 dissolved in 100 parts phenol was fed into a reactor with a gas outlet, wherein it was heated to 130° C. for 2 hours, and then the temperature was gradually elevated. After distilling off the phenol from the reaction mass, the temperature was further elevated. In this duration a violent reaction ensued with an evolution of ammonia. After the evolution of ammonia decreased, the reaction mass was further heated to 250° C., where it was reacted for about 4 hours at a reduced pressure of 1.5 mm. Hg, and thereby a colorless, transparent molten product was obtained. It was stable to heat and was capable of being easily spun into long fibers. Filaments obtained therefrom had a tenacity of 4.5 to 5.5 grammes per denier, a specific gravity of 1.032 and were uniformly and deeply dyed by various dyestuffs to produce dyed filaments having improved resistances to light and alkalis. The molten product was favorably subjected to treatments to form films and molded articles since it was resistant to impact as a plastic.

What is claimed is:

1. The process of producing a polyurea copolymer which comprises heating at least one amine compound from the class consisting of primary diamines having two terminal primary amine groups and a connecting aliphatic hydrocarbon chain wherein at least one carbon atom of said chain is bonded to an alkyl group of no more than 10 carbon atoms, said diamine containing a total of 3–20 carbon atoms to the molecule and carbonates thereof; a polymethylene diamine compound from the class consisting of a primary straight-chained polymethylene diamine having a total of 2–20 carbon atoms to the molecule and carbonates thereof and a urea compound from the class consisting of urea, diurea, methylene diurea, ethylene diurea, methylene dithiourea and ethylene dithiourea in an inert gas atmosphere at a temperature of about 80° C.–130° C. with the evolution of ammonia for a period of time until the evolution of ammonia ceases, continuing heating at a temperature in the approximate range of 140° C.–190° C. with the further evolution of ammonia for a period of time until the evolution of ammonia ceases and subsequently continuing heating at a temperature of about 200° C.–280° C.

2. The process of claim 1 wherein said amine compound is 1,8-diamino-2-ethyloctane, said primary polymethylene diamine is 1,10-diaminodecane, and said urea compound is urea.

3. The process of claim 1 wherein said amine compound is 1,6-diamino-2-methylhexane, said primary polymethylene diamine is 1,6-diaminohexane, and said urea compound is thiourea.

4. The process of claim 1 wherein said amine compound is 1,6-diamino-2,5-diethylhexane, said primary polymethylene diamine is 1,8-diamino-octane, and said urea compound is urea.

5. The process of claim 1 wherein said amine compound is 1,4-diamino-2-methylbutane, the primary polymethylene diamine is 1,5-diamino-heptane, and said urea compound is urea.

6. The process of claim 1 wherein said amine compound is 1,6-diamino-3-isopropyl hexane, said primary polymethylene diamine is 1,6-diaminohexane, and said urea compound is thiourea.

References Cited in the file of this patent

UNITED STATES PATENTS

| | | |
|---|---|---|
| 2,764,601 | Garceau | Sept. 25, 1956 |
| 2,973,342 | Inaba et al. | Feb. 28, 1961 |

FOREIGN PATENTS

| | | |
|---|---|---|
| 534,699 | Great Britain | Mar. 14, 1941 |